2,554,086

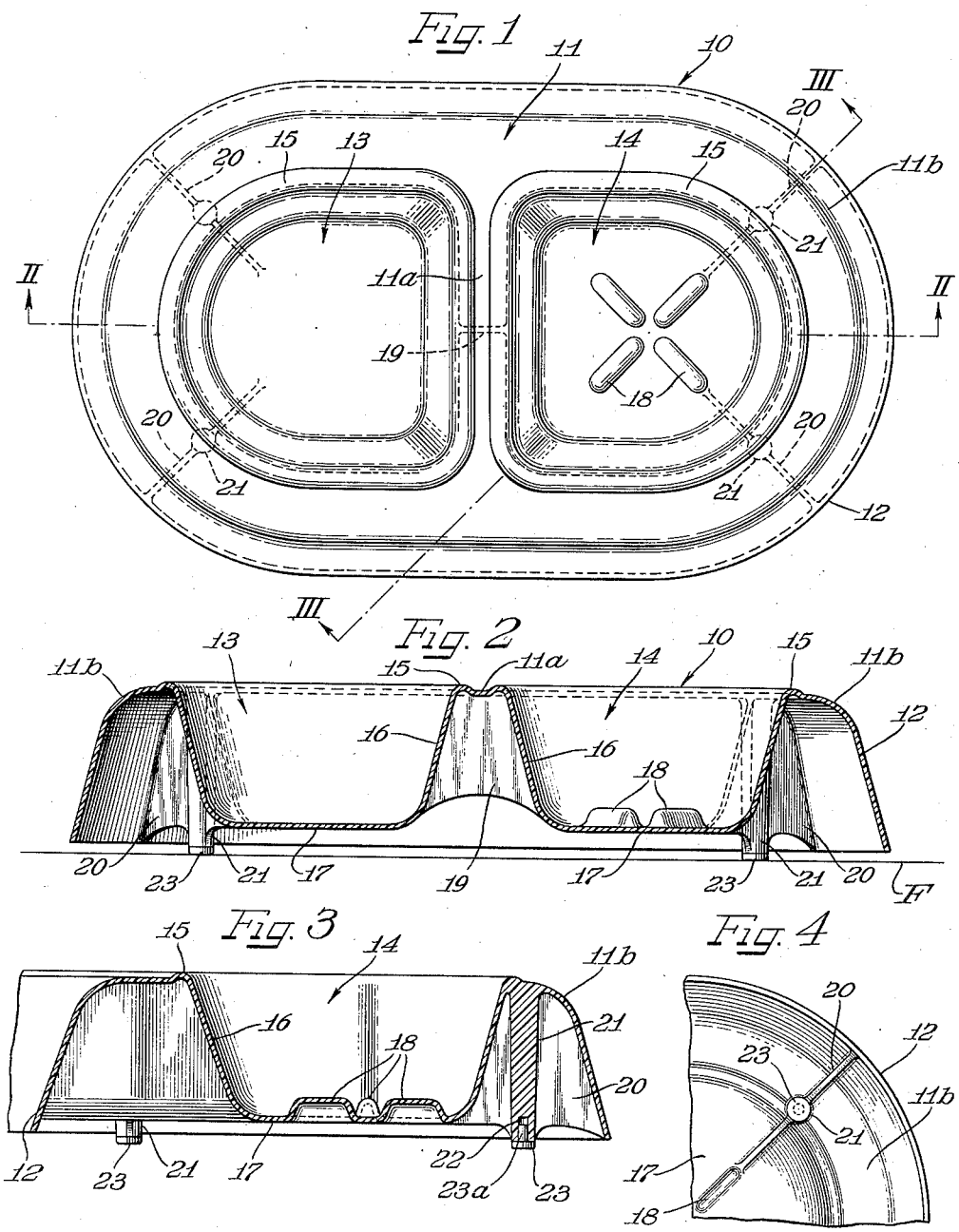
May 22, 1951     C. F. BLOCK     2,554,086
PET FEEDER
Filed Feb. 24, 1949
Inventor
Clarence F. Block
by The Firm of Charles W Hills Attys Patented May 22, 1951

UNITED STATES PATENT OFFICE 2,554,086

PET FEEDER

Clarence F. Block, Barrington, Ill.

Application February 24, 1949, Serial No. 78,219

5 Claims. (Cl. 119—61)

This invention relates to a dish or receptacle-type tray which is especially suitable for use in feeding household pets such as cats, dogs, and the like.

Specifically, the invention deals with a non-tippable one-piece, molded plastic pet feeder having a plurality of dishes surrounded by a protecting skirt which extends close to the floor line.

Heretofore known multiple-compartment pet feeders have been composed of expensive frames carrying a plurality of separate dishes. The present invention now provides an inexpensive multi-compartment pet feeder in one piece and conveniently formed by molding or the like. The feeder of this invention is strong, non-tippable, and rigid, yet relatively light in weight. It is easily cleaned and is arranged so that spillage or cross flow between the compartments or off of the unit is minimized.

It is, then, an object of this invention to provide an inexpensive, molded plastic, one-piece multi-compartment pet feeder.

A further object of the invention is to provide a molded plastic unit having a top wall with a depending peripheral skirt, and a plurality of depressions forming individual dishes, or bowls.

A still further object of the invention is to provide a one piece multi-compartment tray with a peripheral skirt therearound and having reinforcing webs or fins connecting the compartments with the skirt to rigidify the unit.

A still further object of the invention is to provide a one-piece molded plastic multi-compartment tray with rigidifying webs having legs molded therein to carry the unit.

Other and further objects of the invention will be apparent to those skilled in the art from the following detailed description of the annexed sheet of drawings which, by way of a preferred example only, illustrates one embodiment of the invention.

On the drawings:

Figure 1 is a top plan view of the multiple compartment tray or dish of this invention.

Figure 2 is a vertical cross-sectional view taken along the line II—II of Figure 1.

Figure 3 is a vertical cross-sectional view taken along the diagonal line III—III of Figure 1.

Figure 4 is a fragmentary bottom plan view illustrating one of the rigidifying fins or webs.

As shown on the drawings:

The multiple-compartment dish or tray 10 shown in Figures 1 and 2 is a one-piece molded plastic unit preferably formed of readily moldable thermoplastic material such as polystyrene resins or the like. The unit 10 is generally oval-shaped with a top wall 11 that has a substantially flat central portion 11a and a rounded peripheral portion 11b as best shown in Figure 2. This peripheral portion 11b curves downwardly to merge with an outwardly sloping depending skirt 12. Depressions 13 and 14 are formed in the top wall 11 to provide water and food receptacles. Each depression 13 and 14 has a substantially D-shaped open top with a peripheral raised rounded bead 15 therearound. As shown in Figure 1, the flat sides of the D-shaped open tops are adjacent and parallel to each other and extend transversely across the central portion 11a of the top 11. The rounded portions of the D-shaped open tops are adjacent the rounded portions 11b of the top 11. This arrangement gives maximum dish or bowl capacity within a minimum over-all oval dimension for the unit.

Each receptacle 13 and 14 has sloping side walls 16 which converge toward flat bottoms 17 at levels above the bottom of the skirt 12. The bottom 17 of the depression 14 has raised protuberances 18 in the central portion thereof arranged to extend radially from the center of the bottom to form anchors for food so that oleaginous or glutinaceous food material will not rotate or spin around in the receptacle as it is being lapped up by an animal.

Rigidifying fins or webs depend from the top wall 11 between the side walls 16 of the depressions and the skirt 12. These rigidifying webs preferably include a web 19 between the adjacent side walls 16 of the depressions and a plurality of generally radially extending webs 20 between the skirt and the side walls 16. As shown, a pair of webs 20 are provided at each end of the unit 10 and each web extends generally radially from the rounded outer end of the D-shaped receptacles. Each fin 20 has a post portion 21 intermediate the ends thereof and the bottoms of these posts are recessed as at 22. Rubber buttons 23 cover the bottoms of the posts and have shanks 23a anchored in the recesses 22 as best shown in Figure 3.

The buttons 23 form feet which support the unit 10 so that the bottom edge of the skirt 12 is only slightly above the floor level F as shown in Figure 2. This arrangement minimizes the possibility of tipping the unit, since an animal cannot get its nose or paw under the unit. Further, the rounded periphery 11b on the top and the smooth skirt wall and side walls 16 of the receptacles 13 and 14 make it difficult for the animal to grab the unit.

Since the posts 21 extend to the top of the unit and are integral with the webs, the weight of the unit is evenly supported inwardly from the skirt and the skirt wall can be quite thin.

From the above descriptions it should be understood that the invention now provides a one-piece pet feeder that can be conveniently molded from plastic material and is non-tippable, easily cleaned, rigid yet light in weight, and spill-proof.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A multiple feeder tray adapted for serving water and food to dogs, cats, and the like comprising a one-piece generally oval-shaped molded plastic unit having a top wall with a surrounding rounded periphery, an outwardly sloping skirt depending from said periphery, said top wall having a pair of adjacent depressions in the central portion thereof forming receptacles, said depressions having generally D-shaped open tops with their straight sides in closely spaced parallel relation and with their rounded sides spaced inwardly from the rounded periphery of the top, said depressions having converging side walls and flat bottoms at levels not below the bottom edge of the skirt, one of said bottoms having raised protuberances arranged to hold food against rotation, a raised bead on said top wall around the periphery of the D-shaped open top of each depression, a pair of spaced webs in each end of the unit depending from the top wall and connecting the rounded side wall of each depression to the skirt, said webs having integral posts intermediate their inner and outer ends, an additional web depending from the central portion of the top wall and connecting the adjacent side walls of the depressions, said beads and said webs cooperating to rigidify the unit and said beads preventing spillage between the depressions, and resilient buttons on the bottoms of the posts projecting slightly beyond the skirt for supporting the unit so that the skirt is slightly raised above the supporting surface.

2. A multiple dish comprising a one-piece molded plastic unit having a top wall, a peripheral skirt depending therefrom, and a pair of depressions therein forming adjacent receptacles, integral fins connecting the skirt and depressions at spaced intervals, and feet on said fins supporting the unit to carry the skirt and bottoms of the depressions at levels above the support surface.

3. A pet feeder comprising a one-piece unit having a top with a plurality of open-topped recesses forming food and water dishes, an outwardly sloping peripheral skirt depending from said top, fins connecting the top and the walls of the recesses with the skirt, and feet on said fins supporting the unit inwardly from the skirt.

4. A dish comprising a hollow unit having a top with a deep depression therein forming a bowl, a skirt depending from the top around the bowl, integral fins connecting the skirt and bowl at spaced intervals around the bowl, and feet on the bottoms of the fins for supporting the dish.

5. A multiple feeder tray adapted for serving water and food to dogs, cats, and the like comprising a one-piece generally oval-shaped molded plastic unit having a top wall surrounded by a raised peripheral bead, an outwardly sloping skirt depending from the outer edge of said bead, a pair of adjacent depressions in the central portion of said top wall forming receptacles, said depressions having generally D-shaped open tops with their straight sides in closely spaced relation, said depressions having converging side walls and flat bottoms at levels not below the bottom edge of the skirt, one of said bottoms having raised protuberances arranged to hold food against rotation, a separate raised bead on said top wall around the periphery of the D-shaped open top of each depression, a pair of spaced vertical fins extending radially outward from the rounded outer side of each side wall of a depression to the skirt, said fins having integral recessed posts intermediate their inner and outer ends, and resilient buttons on the bottoms of the posts and anchored in said recesses to form feet for supporting the unit.

CLARENCE F. BLOCK.

REFERENCES CITED

The following references are of record in the file of this patent:

UNITED STATES PATENTS

| Number | Name | Date |
| --- | --- | --- |
| D. 86,987 | Vogan | May 17, 1932 |
| D. 105,450 | Clifton | July 27, 1937 |
| 1,038,647 | Pitt | Sept. 17, 1912 |
| 2,108,863 | Kieft | Feb. 22, 1938 |
| 2,213,837 | Gill | Sept. 3, 1940 |
| 2,259,682 | Collins | Oct. 21, 1941 |